United States Patent  
Gavali et al.

(10) Patent No.: US 10,976,929 B2
(45) Date of Patent: *Apr. 13, 2021

(54) COGNITIVELY MANAGED STORAGE VOLUMES FOR CONTAINER ENVIRONMENTS

(71) Applicant: International Business Machines Corporation, Armonk, NY (US)

(72) Inventors: Pramod V. Gavali, Pune (IN); Shaikh Ikhlaque Ali, Bangalore (IN); Akash V. Gunjal, Belgaum (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/357,595

(22) Filed: Mar. 19, 2019

(65) Prior Publication Data

US 2020/0301583 A1    Sep. 24, 2020

(51) Int. Cl.
*G06F 3/06* (2006.01)

(52) U.S. Cl.
CPC .......... *G06F 3/0604* (2013.01); *G06F 3/0629* (2013.01); *G06F 3/0655* (2013.01); *G06F 3/0673* (2013.01); *G06F 2213/0008* (2013.01); *G06F 2213/0036* (2013.01)

(58) Field of Classification Search
CPC ..... G06F 3/0604; G06F 3/0629; G06F 3/0655
See application file for complete search history.

(56) References Cited

U.S. PATENT DOCUMENTS

| 4,876,662 | A | 10/1989 | Pence |
| 6,865,597 | B1 | 3/2005 | Bandopadhyay et al. |
| 8,423,731 | B1* | 4/2013 | Nadathur ............ G06F 11/1461 707/640 |
| 2005/0216591 | A1 | 9/2005 | Sato |
| 2009/0228589 | A1 | 9/2009 | Korupolu |
| 2011/0145494 | A1 | 6/2011 | Mitsuma et al. |
| 2012/0254861 | A1 | 10/2012 | Down, Jr. et al. |
| 2017/0257424 | A1* | 9/2017 | Neogi ..................... H04L 43/16 |
| 2017/0270449 | A1* | 9/2017 | Shrimali .......... G06Q 10/06315 |
| 2019/0065096 | A1* | 2/2019 | Sterin ................. G06F 16/1824 |
| 2019/0220315 | A1* | 7/2019 | Vallala .................... G06F 9/455 |

OTHER PUBLICATIONS

Gavali et al., "Cognitively Managed Storage Volumes For Container Environments," U.S. Appl. No. 16/511,248, filed Jul. 15, 2019.
(Continued)

*Primary Examiner* — David Yi
*Assistant Examiner* — Nicholas A. Paperno
(74) *Attorney, Agent, or Firm* — Jorge R. Maranto

(57) ABSTRACT

A method and system for pre-attaching volumes onto a host. The method includes analyzing a plurality of hosts in a cloud environment. The method also includes identifying a least populated host based on the analyzation of the hosts. The least populated host is based on the attributes of the hosts. The method also includes identifying at least one popular volume in the cloud environment. The popular volume is a volume type most frequently used by the hosts in the cloud environment. Further, the method includes attaching the popular volume to the least populated host.

7 Claims, 8 Drawing Sheets

(56) References Cited

OTHER PUBLICATIONS

List of IBM Patents or Patent Applications Treated as Related, Signed Jul. 15, 2019, 2 pages.
"Extending your Kubernetes Cluster," kubernetes Concepts, last modified: Oct. 9, 2018, 9 pages. htttps://kubernetes.io/docs/concepts/extend-kubernetes/extend-cluster/#scheduler-extensions.
Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

\* cited by examiner

COGNITIVELY MANAGED STORAGE VOLUMES FOR CONTAINER ENVIRONMENTS

BACKGROUND

The present disclosure relates to attachment of storage volumes to hosts, and more specifically, to a pre-attachment of storage volumes to hosts in a container-based environment.

Launching applications in a container-based environment, such as Red Hat® (a trademarked product of Red Hat Software for providing open-source software), OpenShift® (a trademarked product of Red Hat Software for providing containerization software), or Docker® (a trademarked product of Docker for providing operating-system-level virtualization), is a routine operation that frequently occurs. For example, orchestrators can deal with hundreds, thousands, or even millions of containers each or which can launch and execute applications. While many applications can operate utilizing only ephemeral data, other applications, may require at least some of the data to be persistent. Persistent data can be stored on storage volumes that reside outside of the container environment. These storage volumes can be attached onto hosts and mounted to containers which the applications can access and store persistent data.

SUMMARY

Various embodiments are directed to a method of pre-attaching popular volumes to a host. The method can include analyzing a plurality of hosts in a cloud environment to determine various attributes of the hosts. The method can also include identifying a least populated host based on analyzing the hosts. The least populated host can be based on the attributes of the hosts that were analyzed. The method can also include identifying at least one popular volume in the cloud environment based on analyzing the hosts. The popular volume can be a volume type most frequently used by the hosts in the cloud environment. Further, the method can include attaching the popular volume to the least populated host.

Various other embodiments directed to a method of pre-attaching popular volumes on a host can further include identifying a least populated host in a cloud environment by detecting a number of containers deployed on the hosts. The method can also include determining a CPU usage of the hosts. The CPU usage can be a percentage of processing power used by the hosts. The method can include determining a memory usage of the hosts. The memory usage can be a percentage of total memory used by the hosts. Further, the method can include identifying a least populated host based on the number of containers deployed, the CPU usage and the memory usage of the hosts.

Various other embodiments directed to a method of pre-attaching popular volumes on a host can further include identifying at least one popular volume by determining a plurality of volumes used in the cloud environment and ranking those volumes to develop a rank based on parameters of the volumes. The method can further include a rank threshold based on the rank of the volumes to determine which volumes to attach to the least populated host. Further, the method can include identifying at least one popular volume that is ranked greater than the rank threshold.

Additional embodiments are directed to a system, which can include at least one processing component, at least one memory component, the memory component having program instructions which cause the processor to analyze a plurality of hosts in a cloud environment to determine various attributes of the hosts. The instructions can also cause the processor to identify a least populated host based on analyzing the hosts. The least populated host can be based on the attributes analyzed regarding the hosts. The instructions can also cause the processor to identify at least one popular volume in the cloud environment based on analyzing the hosts. The popular volume can be a volume type most frequently used by the hosts in the cloud environment. Further, instructions can also cause the processor to attach the popular volume to the least populated host.

Further embodiments are directed to a computer program product for deploying a workload on pre-attached hosts, which can include a computer readable medium having program instructions therewith, the program instructions executable by a processor to cause the device to execute instructions. The instructions cause the device to receive a workload. The workload can include a workload volume list of at least one volume type to be used by the workload. The device can also determine a plurality of available hosts and determine a plurality of available pre-attached hosts. The pre-attached hosts can include a popular volume attached to the pre-attached hosts. The popular volume can be a volume type listed in the workload volume list. The device can also compare the available hosts to the pre-attached hosts and select a selected host based on the comparison. Further, the device can deploy the workload onto the selected host.

BRIEF DESCRIPTION OF THE DRAWINGS

These and other features, aspects, and advantages of the embodiments of the disclosure will become better understood with regard to the following description, appended claims, and accompanying drawings where:

Figure 1:
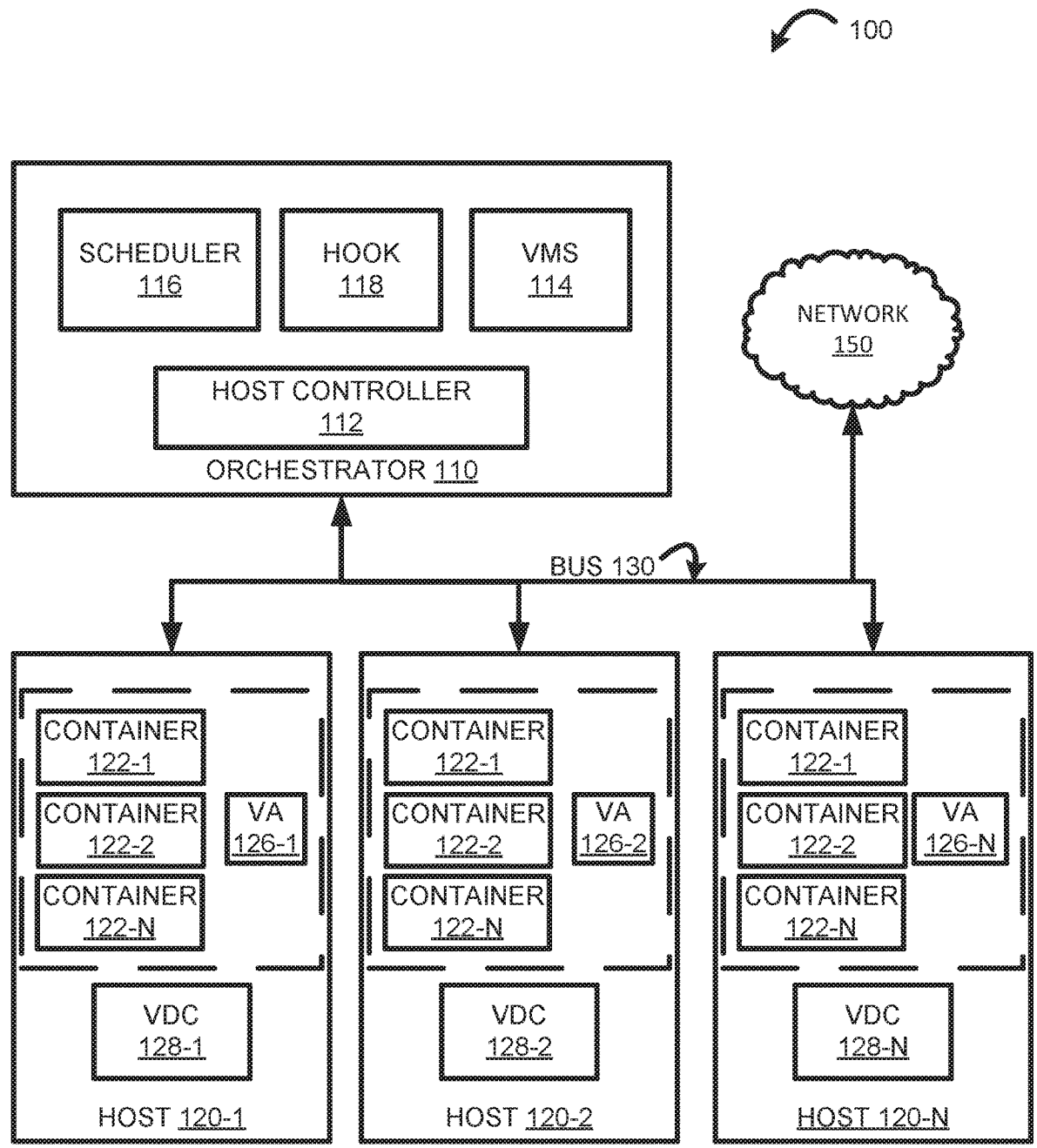
FIG. 1 is a diagram of a host system that connects multiple hosts to an orchestrator, according to embodiments of the present disclosure.

While the disclosure is amenable to various modifications and alternative forms, specifics thereof have been shown by way of example in the drawings and will be described in detail. It should be understood, however, that the intention is not to limit the particular embodiments described. On the

DETAILED DESCRIPTION

In a container-based environment, mounting storage volumes typically requires a multi-step process that involves Infrastructure as a Server (IaaS) interaction. First, a storage volume must be provisioned with an IaaS provider. Second, IaaS application programming interface (API) is used to discover the required endpoints. Third, the authorization and attachment occur on the requested host. Fourth, the volume is formatted, and finally the volume is mounted and ready for use. At least some of these steps must be repeated on every host using some type of storage volume. This can create a slowdown when attempting to launch an application on a new host.

Also, applications have the ability to migrate from one host to another or can scale up or down depending on the situation. During migration, applications are typically rescheduled and restarted without utilizing or relying on any previous volumes or services provided by the previously used host. Restarting an application can also takes several steps such as, installing dependencies, allocating processor and memory usage, as well as mounting any persistent volumes requested by the application.

Whether it be launching a new application, migrating an application, or restarting an application, mounting a volume is a time-consuming process. The mounting process for a storage volume can generally take up to 60% of a total restart time when an application is first scheduled onto a host. Examples of storage volumes include NFS, Fibre Channel (FC), iSCSI, block storage, Glusterfs, GCEPeristentDisk, AzureFile, and many others. It is common that applications may utilize volumes with varying properties. These properties can include performance, size, speed, and access modes of the volume. Hence, a variety of volumes are offered to cater to the specific needs of an application. Despite the varying types of available storage volumes, the mounting process typically remains the same. Thus, to alleviate some of the start-up time of an application, embodiments of the disclosure pre-attach volumes onto hosts prior to a request by an application.

Disclosed herein are a method and a system for pre-attaching storage volumes onto a host used for launching applications. The system can analyze every host within an environment to determine which types of volumes are used and how many containers are deployed on each host. Once analyzed, the system can identify the least populated hosts as well as the most frequently used volumes. After identifying the least populated hosts and most frequently used volumes, the system can mount at least one popular volume onto at least one of the least populated hosts. Thus, when an application is launched from a least populated host, the type of volume it requires may already be mounted to the host. This can decrease the launch time of an application because the volume is pre-attached to the host prior to the launch of the application.

FIG. 1 is a block diagram illustrating a host system 100, according to embodiments of the present disclosure. The host system 100 includes, but is not limited to, an orchestrator 110, hosts 120-1, 120-2, 120-N (collectively "host 120"), and a bus 130. The orchestrator 110 includes a host controller 112, a volume management system ("VMS") 114, a scheduler 116, and a hook 118. The host 120 includes a container 122-1, 122-2, 122-N (collectively "container 122"), a volume agent ("VA") 126-1, 126-2, 126-N (collectively "VA 126"), and a volume data collector ("VDC") 128-1, 128-2, 128-N (collectively "VDC 128"). The orchestrator 110 is communicatively coupled to the host 120 over the bus 130. The overall host system 100 is also communicatively coupled to a network 150 over the bus.

The orchestrator 110 is a component of the host system 100 configured to detect and make decisions to events regarding the hosts 120. In some embodiments, the orchestrator 110 operates as a master node in a Kubernetes® (a trademarked product of The Linux Foundation for managing containerized workloads and services) environment. Components of the orchestrator 110 can operate on hosts 120. For example, any host 120 can be deemed as the orchestrator 110 to facilitate the needs of the host system 100. However, for simplicity, all orchestrator 110 components are started on the same machine, and do not run applications. Typically, all interactions with the hosts 120 operate through the orchestrator 110 and its various components. The orchestrator 110 is also configured to be responsible for deciding what runs on the hosts 120. For example, the orchestrator 110 can schedule workloads, such as launching applications, as well as managing a workloads lifecycle, scaling, and upgrades. The orchestrator 110 also manages network and storage resources for the workloads.

The host controller 112 is a component of the orchestrator 110 configured to execute decisions determined by the orchestrator 110. In some embodiments, the host controller 112 is responsible for noticing and responding when a host is no longer operable, for maintaining the correct number of containers during replication, populates the endpoints, and creates default accounts and API access tokens. The host controller 112 also interacts with the network 150 as needed. For example, the host controller 112 can check the network 150 to determine if a host has been deleted. The host controller 112 is also configured to create, attach, and mount volumes and to interact with the network 150 to arrange and direct the volumes.

The VMS 114 is a component of the orchestrator 110 configured to manage the volumes attached to the hosts 120. While shown as a separate component in FIG. 1, it should be understood that the VMS 114 may be arranged as part of the host controller 112 or any other suitable component of the host system 100, in some embodiments. The VMS 114 can maintain data about how many containers are deployed on each host 120 in real-time and the number of times each volume has been attached to the containers in the entire cloud. With that information, the VMS 114 can determine which hosts 120 are the least populated on the network 150. The VMS 114 can also analyze the volume mounts on the network 150 and prepare and maintain a list of frequently used volumes, or "popular" volumes. In some embodiments, the VMS 114 utilizes the data it maintains and decides which host 120 to pre-attach a volume to. For example, the VMS 114 can determine that an NFS volume is a popular volume and can pre-attach the NFS volume to a host 120.

The scheduler 116 is a component of the orchestrator 110 configured to assign which hosts run newly created or migrated containers. In some embodiments, the scheduler takes into account individual and collective resource requirements of the containers and hosts. For example, the scheduler 116 can identify a host 122 with available resources to accommodate a newly launched container 122. Other factors, such as policy constraints, affinity and anti-affinity specifications, data locality, inter-workload interference, and deadlines can also be considered by the scheduler 116 when determining which host 120 to launch a container 122 to.

The hook 118 is a component of the orchestrator 110 configured to integrate the VMS 114 with the scheduler 116. While shown as a separate component in FIG. 1, it should be understood that the hook 118 may be arranged as part of the host controller 112 or any other suitable component of the host system 100, in some embodiments. The hook 118 is also configured to provide an interface such that the VMS 114 can communicate with the scheduler 116 to provide additional host 120 filtration and to narrow down the host 122 selection based on the pre-attached volumes. For example, the hook 118 allows the VMS 114 to receive a list of hosts 120 from the scheduler 116 and to communicate a refined host list from the VMS 114 to the scheduler 116.

The host 120 is a component of the host system 100 configured to execute and run containerized applications and other workloads. Embodiments of the host 120 can also be performed as a node in a Kubernetes® environment or similar cloud environments. A host 120 can be a physical machine or a virtual machine ("VM") depending on the configuration of the host system 100. Also, each host 120 can contain the necessary services to run containers as well the necessary components to be managed by the orchestrator 110.

The container 122 is a component of the host system 100 configured to be an executable package of software that runs applications. Included within the container are code, runtime, system tools, system libraries, and settings. Multiple containers 122 can run on a single host 120 and are limited only by the resource limitations of the host. In some embodiments, multiple containers 122 are grouped together into container clusters (e.g., Kubernetes® pods), that are deployed together and function as an interconnected whole.

The VA 126 is a component of the host system 100 configured to attach and detach volumes from the host 120. While shown as a separate component in FIG. 1, it should be understood that the VA 126 may be arranged as part of the host 120 or any other suitable component of the host system 100, in some embodiments. The VA 126 is deployed in every host 120 in the host system 100 and receives commands from the VMS 114 regarding the volume details which it attaches locally to the node 120. For example, a VA 126 can mount the various volumes requested by the container 122 and can also pre-attach volumes that are requested by the VMS 114.

The VDC 128 is a component of the host system 100 configured to send information to the orchestrator 110 regarding volumes mounted to the host 120. While shown as a separate component in FIG. 1, it should be understood that the VDC 128 may be arranged as part of the host 120 or any other suitable component of the host system 100, in some embodiments. Upon container deployment, the VDC 128 running on the node 120 can fetch the volume details used by the container 122 and provide that information, as well as attached volume details, to the VMS 114. For example, a container 122 can be deployed on a host 120 that uses an NFS volume. The host 120 may also have an iSCSI volume attached. The VDC 128 can report to the VMS 114 the volume information so that the VMS 114 can utilize that information in making its determinations.

The bus 130 is a component of host system 100 configured to facilitate direct, high-speed data transfers and communication between the host 120, the orchestrator 110, and the network 150. In some embodiments, the bus 130 is an internal bus. In some other embodiments, the bus 130 is an external bus. Examples of the bus 130 include a LAN, a WAN, a Fibre Channel (FC), and any combination thereof. In some embodiments, implementations interconnect together into many network configurations capable of communicating over long distances. The bus 135 is configured to transfer data utilizing a variety of standards. Some standards include the Small Computer System Interface (SCSI), Fibre Channel, fiber connection (FICON), and Internet Protocol (IP) standards.

The network 150 is a component of system 100 configured to facilitate direct, high-speed data transfers and communication between the hosts 120 and the orchestrator 110. In some embodiments, the network 150 is an internal bus. In some other embodiments, the network 150 is an external bus. Examples of the network 150 include a local area network (LAN), a wide area network (WAN), a storage area network (SAN), intranet, or any combination thereof.

Figure 2:
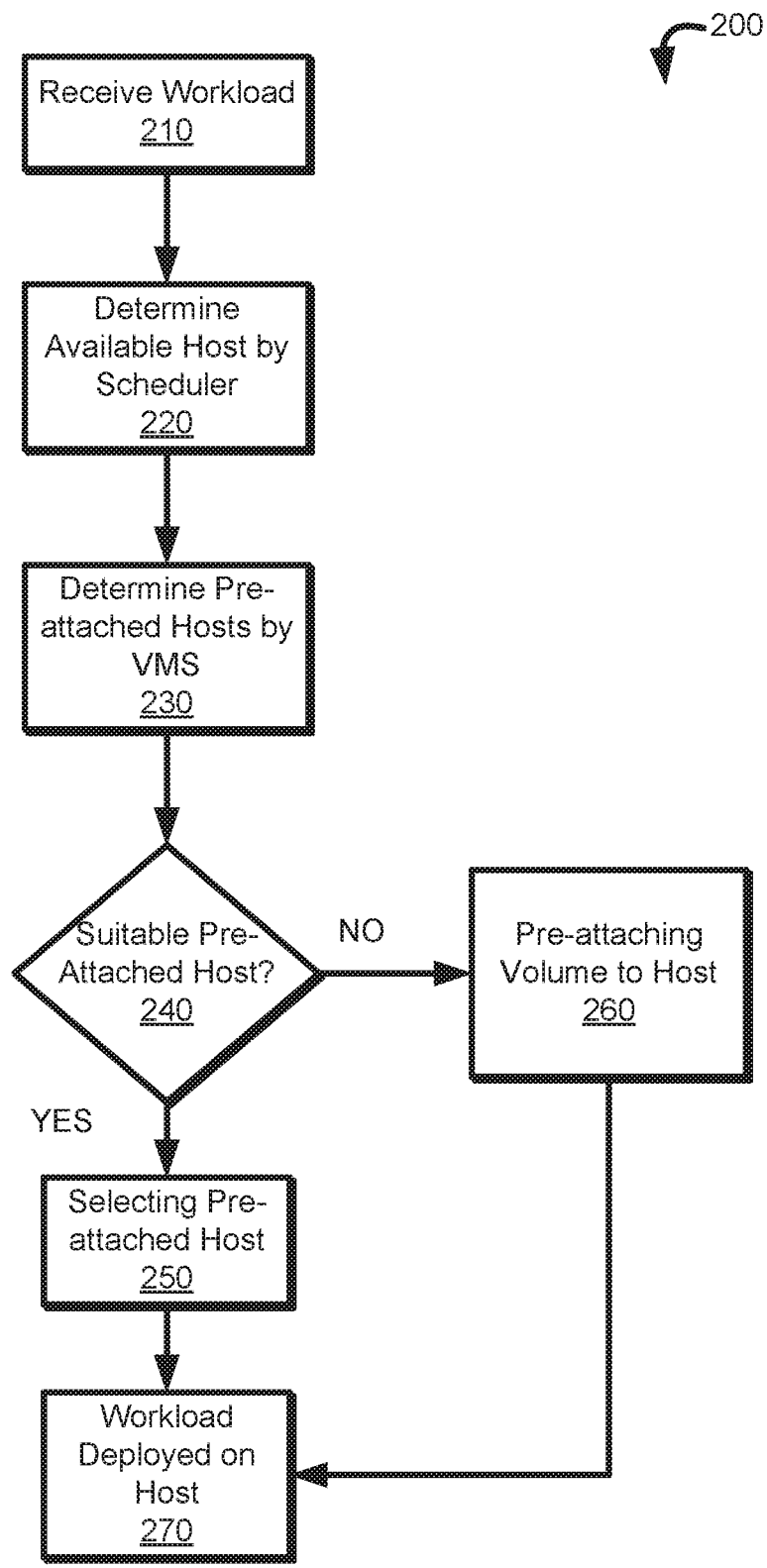
FIG. 2 is a flow diagram illustrating a process of deploying a workload on a host system, according to embodiments of the present disclosure.

FIG. 2 is a flow diagram illustrating a process 200 of deploying a workload onto a host system 100, according to embodiments of the present disclosure. To illustrate process 200, but not to limit embodiments, FIG. 2 is described within the context of host system 100 of FIG. 1. Where elements described with respect to FIG. 2 are identical to elements shown in FIG. 1, the same reference numbers are used in both Figures.

A scheduler 116 evaluates a workload and the hosts 120 operating within the host system 100 to determine which hosts 120 are available to receive the workload. This is illustrated at step 210. A workload is an application or set of applications that can be containerized and can be individually operated upon and executed. The workload can also include processes, daemons, and batch jobs. The workload can be sent directly by a user, developer, administrator, or by any other means now known or later developed. In a simplified example, the workload can include numerous applications, batch jobs, and daemons along with other information regarding how the workload is to be deployed. Once the scheduler 116 determines which hosts 120 are available, the scheduler 116 can generate a list of possible hosts 120 to deploy the workload. For example, the scheduler 116 can generate a list that contains a host 120-1 and host 120-2 that capable of receiving the workload. The host list generated by the scheduler 116 is then sent over to the VMS 114 using the hook 118.

The VMS 114 analyzes the host list generated by the scheduler 114 to determine if there is a corresponding host 120 that has a pre-attached volume that the workload requires. This is illustrated at step 230. A pre-attached host list can be maintained by the VMS 114 to compare with the scheduler host list. To find an appropriate host 120, the VMS 114 can analyze the workload to determine what type of volume is required for deployment and then compare that requirement with the VMS host list to see if any hosts 120 have a pre-attached volume of the required type. For example, if the workload requires an iSCSI volume and host 120-2 has an iSCSI volume pre-attached then the VMS 114 can notify the scheduler 116 of that information.

To make the list comparison, the VMS 114 searches the VMS host list to make a determination in finding a matching pre-attached host. This is illustrated at step 240. The VMS 114 can access a database to retrieve a suitable host 120. In some embodiments, the host database is updated whenever a host is used in a deployment, when a workload is deleted, and during regular intervals. This allows the VMS 114 to maintain an up-to-date list of possible hosts 120 in such a way as to allow for an accurate representation of pre-attached hosts 120. If a suitable host 120 is located within the database, it can be used to deploy the workload as illustrated at step 250.

However, if a pre-attached host 120 is not found and no host 120 has the appropriate pre-attached volume, the VMS 114 can prepare a suitable host 120 for deployment. This is illustrated at step 260. In some embodiments, no pre-attach process occurs, and the scheduler selects a host 120 for deployment. For example, if no host 120 has a pre-attached volume corresponding to the required volume of the workload, the scheduler 116 can then select any available host 120 as it deems appropriate.

To prepare a suitable host 120, a host list can be sent for pre-attachment of the volume. In some embodiments, the suitable host list is a list maintained by the VMS 114. In some other embodiments, the suitable host list is the scheduler host list. Once the suitable host list is received, the volume required by the workload can be pre-attached. The VA 126, from a host 120 on the suitable host list, can then mount the volume required by the workload. If several volumes are required, each volume can be mounted to the host 120 prior to deployment of the workload. Once mounted, the pre-attached host list can be updated with the corresponding information of the host 120. Information such as which type of volume was mounted, which host was utilized, and the number of applications can all be sent by the VA 126 to the VMS 114.

After the host 120 is pre-attached with the corresponding volume, the VMS 114 can return the selected host 120 back to the scheduler for deployment of the workload. If no pre-attachment has occurred, the VMS 114 can simply return the scheduler host list back to the scheduler 116. In some embodiments, several hosts 120 are sent to the scheduler 116 which have the required volume(s) pre-attached. The scheduler 116 can deploy the workload on any of the hosts 120 returned by the VMS 114 as illustrated at step 270.

Figure 3:
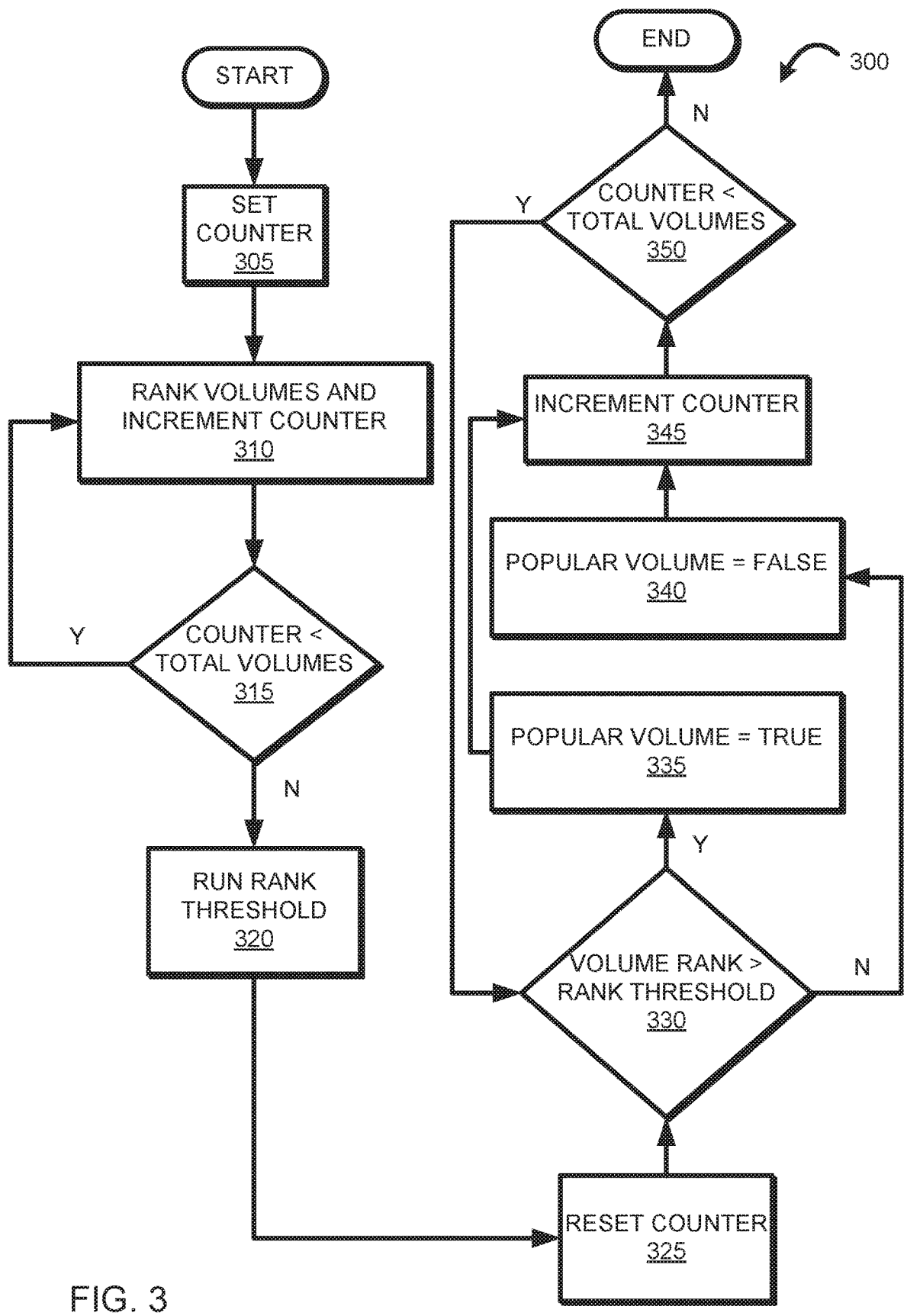
FIG. 3 is a flow diagram illustrating a process of determining a popular volume, according to embodiments of the present disclosure.

FIG. 3 is a flow diagram illustrating a process 300 of determining popular volumes for pre-attachment to hosts 120, according to some embodiments of the present disclosure. To illustrate process 300, FIG. 3 is described within the context of host system 100 of FIG. 1.

A counter is initially set to allow for traversal of each volume used by the host system 100. This is illustrated at step 305. Typically, the counter is initially set to zero to allow a traversal of all the volumes. However, the counter can be set to any pre-determined number to allow for partial traversal of the volumes.

After the counter is set, the volumes are ranked to determine which volumes to pre-attach and the counter is incremented. This is illustrated at step 310. A ranking of volumes can be based on a variety of parameters. A parameter can be the total time duration that a volume was in usage by a container 122. For instance, a volume may have a duration of 12 hours or 36 hours. The longer the duration, the more value the parameter gives to the volume. Another parameter may be the number of containers 122 that use a particular volume type. For example, a particular volume type can be mounted to twelve different containers 122. The number of containers 122 utilizing a particular volume type can indicate that a volume is popular. Another example of a parameter can be volume usage. A time window can be used to consider all volume usage (e.g., two days, one week, one month). During that time window, the volumes that are used are ranked higher then those that are not. The less usage or time that a volume has not be used, the lower the rank. Another parameter that can be used can be volume input/output ("I/O") per interval. An interval of time can be set to determine the amount of I/O that a volume type performs. The larger amount of I/O performed by a volume type can be used as an indicator of higher rank. The fewer I/O operations performed, the lower the rank of the volume. While these are just a few examples of possible parameters, this is not intended to be an exhaustive list and any parameter can be used to determine volume ranking.

In one embodiment, the volumes are ranked according to:

$$R(vol) = \frac{\sum_{i=1}^{n} V(pi) \times W(pi)}{n} \quad \text{Equation 1}$$

Parameters, such as the example parameters listed above, can be used in Equation 1 where each parameter pi is given a value V and a weight W. The weight can dictate which parameter is of higher importance in calculating the ranking of the volumes. For example, the total number of containers parameter may have a higher weight than the volume usage parameter. The types of parameters used, and the weight of each parameter can be altered and adjusted as an administrator sees fit. The summation of each value of parameter V(pi) multiplied by the weight of the parameter W(pi) is calculated and then divided by the total number of parameters n. The result of which is used a rank R for the particular volume vol. Once the rank is calculated, the counter is incremented.

A determination is made by process 300 as to whether the counter is less than the total number of volumes to be ranked. This is illustrated at step 315. If the counter is less than the total number of volumes, step 310 is repeated until all the volumes are ranked and the counter is incremented to overcome the restriction. However, if the counter is not less than the total number of volumes, then the process 300 proceeds to step 320.

A rank threshold is calculated to determine which volumes to consider for pre-attachment. This is illustrated at step 320. The volume with a rank greater than the threshold can be considered for pre-attachment. This allows for a limited number of volumes to be selected for pre-attachment so that the host system 100 is not overwhelmed and the hosts 120 are not encumbered with unnecessary pre-attachments. For example, a threshold can be set such that only the top three ranked volumes are selected for pre-attachment. An administrator can adjust the threshold as necessary to correspond to the needs of the host system 100.

In one embodiment, the rank threshold is determined according to:

$$T = \frac{\sum_{i=1}^{n} R(Vi)}{n} \quad \text{Equation 2}$$

Where Vi is the volume of i, where R(Vi) is the rank of volume Vi, and where the total number of volumes is indicated as n. The rank threshold can be re-calculated at regular intervals dynamically or can be set by an administrator to run when a condition is met. For example, when a workload is deployed or when a workload is deleted. In some embodiments, the volume ranks are calculated using Equation (1). However, other ranking equations can also be used to determine the rank threshold.

The counter is reset back to the starting number set at step 305. This is illustrated at step 325. Depending on which volumes are to be ranked, the counter is set and reset. In some embodiments, the counter is reset to zero. This allows for the specified volumes to be ranked and utilized by the rank threshold.

A determination is made by the process 300 to see whether the rank of the volume exceeds the rank threshold. This is illustrated at step 330. Each volume is evaluated and if the rank of the volume exceeds the rank threshold then that volume is considered as a popular volume. However, if the volume rank does not exceed the rank threshold, then the volume is not considered as a popular volume.

If the volume rank is greater than the rank threshold, the process 300 proceeds to step 335. A volume popularity list can be updated to indicate that the volume is considered popular. In some embodiments, a database is maintained with the popularity information as it is determined. However, if the volume is not greater than the rank threshold, the process 300 proceeds to step 340. The volume popularity list can be updated to indicate and keep track of which volumes are not considered popular and should be pre-attached to hosts 120. As with the popular volumes, a database can be maintained with a list of unpopular volumes.

After both step 335 and 340, the process 300 proceeds by incrementing the counter. This is illustrated at step 345. In order to evaluate each volume, the counter is incremented to allow the process 300 to cycle through each volume rank.

A determination is made by process 300 to see whether the counter is less than the total number of volumes. This is illustrated at step 350. If the counter is determined to be less than the total number of volumes, the process 300 returns to step 330. However, if the counter is not less than the total number of volumes, then process 300 is complete and the volumes have been ranked and evaluated with the rank threshold.

Figure 4:
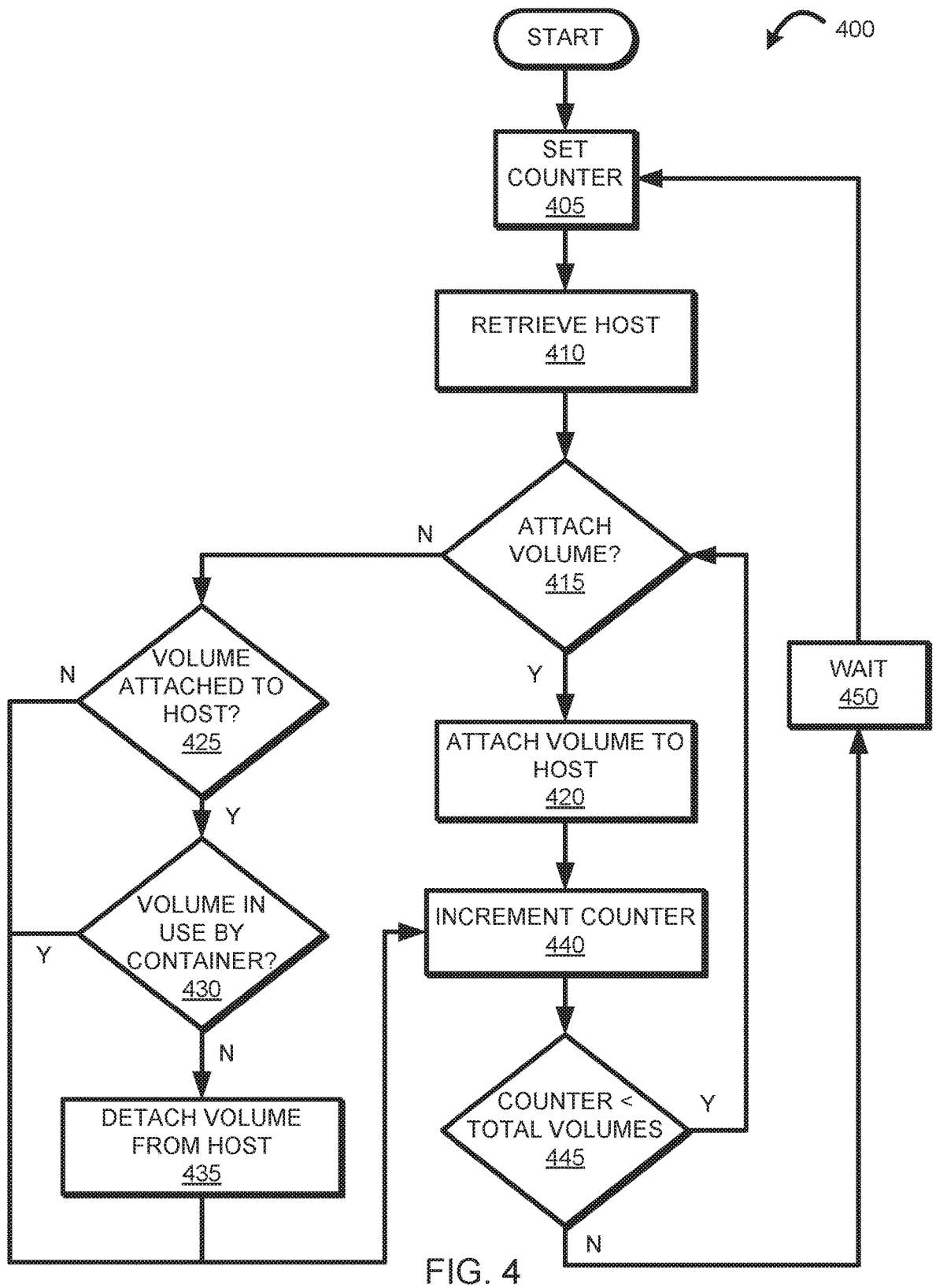
FIG. 4 is a flow diagram illustrating a process of pre-attaching popular volumes to hosts, according to embodiments of the present disclosure.

FIG. 4 is a flow diagram of a process 400 of pre-attaching popular volumes to hosts 120 associated with a host system 100, according to some embodiments of the present disclosure. In some embodiments, the popular volumes are determined using the process illustrated in FIG. 3. However, other approaches can be used to identify popular volumes.

A counter is initially set to allow for traversal of each volume used by the host system 100. This is illustrated at step 305. Typically, the counter is set to zero to allow a traversal of all the volumes.

The host controller 112 retrieves a host 120 for pre-attachment of popular volumes. This is illustrated at step 410. In some embodiments, a host 120 with the most available resources is retrieved. For example, hosts 120 can be evaluated to determine which host 120 has the fewest containers 122 or which host 120 has done the least amount of work over a period of time. Different evaluations can be conducted to determine which hosts 120 to retrieve. The VDC 128 located on each host 120 can update the VMS 114 with the host 120 information to allow for a determination to be made as to which host 120 to retrieve.

Once the host 120 is retrieved, the volumes are inspected to determine whether they are considered popular and thus eligible for pre-attachment. This is illustrated at step 415. In some embodiments, process 300 is triggered to evaluate the volumes so that process 400 can proceed with the pre-attachment process. The volumes considered as popular can be pre-attached to the host 120. The VMS 114 can check the popularity list generated by process 300 in making the determination. If the volume is considered popular, the process 400 proceeds to step 420. However, if the volume is not considered popular, the process 400 proceeds to step 425.

The VMS 114 instructs the VA 126 to pre-attach the volume onto the host 120. This is illustrated at step 420. The VA 126, tasked with pre-attaching volumes of the host 120, checks to see whether the volume is already attached to the host 120. If the volume is already attached, the VA 126 need not reattach the volume. However, if the volume is not attached to the host 120, then the VA 126 attaches the volume. The VDC 128 provides the VMS 114 with which volumes are attached to the host 120 and the VA 126 can also use that information in deciding whether the volume needs attachment or if it is already attached.

This pre-attachment of volumes process proceeds for each popular volume. To cycle through each volume, the counter is incremented. This is illustrated at step 440. The counter is checked to determine whether or not it is less than the total number of volumes as illustrated at step 445. If the counter is less than the total number of volumes, the process 400 proceeds back to step 415 to analyze the next volume. However, if the volume count is not less the total number of volumes, then process 400 proceeds to step 450.

If a volume being analyzed at step 415 is not a popular volume, the VA 126 determines whether the volume is already attached to the host. This is illustrated at step 425. An active host 120 may have several volumes attached and mounted to several operating containers 122. If a volume is not attached to a host 120, the process 400 can proceed to step 440. However, if a volume is attached, the process proceeds to step 430 to determine whether the volume is in-use by the containers 122 within the host 120.

Containers 122 deployed in the host 120 are scanned to determine whether the volume is in-use by any of the containers 122. This is illustrated at step 430. Containers may request volumes to be attached and mounted as needed by an application. When the application no longer requires the volume, the VA 126 can detach the volume from the host. This is illustrated at step 435. The detachment of volumes allows a host to be unencumbered from the volume and frees available resources the volume may have been using. However, if a volume is still in-use, regardless of whether or not it is a popular volume, the VA 126 will keep the volume mounted and proceed to step 440 to evaluate the next volume.

Once all the volumes are evaluated on the retrieved host 120, the process waits a pre-determined time before another host is selected for the pre-attachment process 400. This is illustrated at step 450. In some embodiments, a triggering event occurs that reinitiates the pre-attachment process 400. For example, while process 400 is waiting, a workload deployment may be received which can trigger a pre-attachment of a host 120. The wait time can be adjusted as an operator sees fit such that the process it utilized in an efficient manner.

Figure 5:
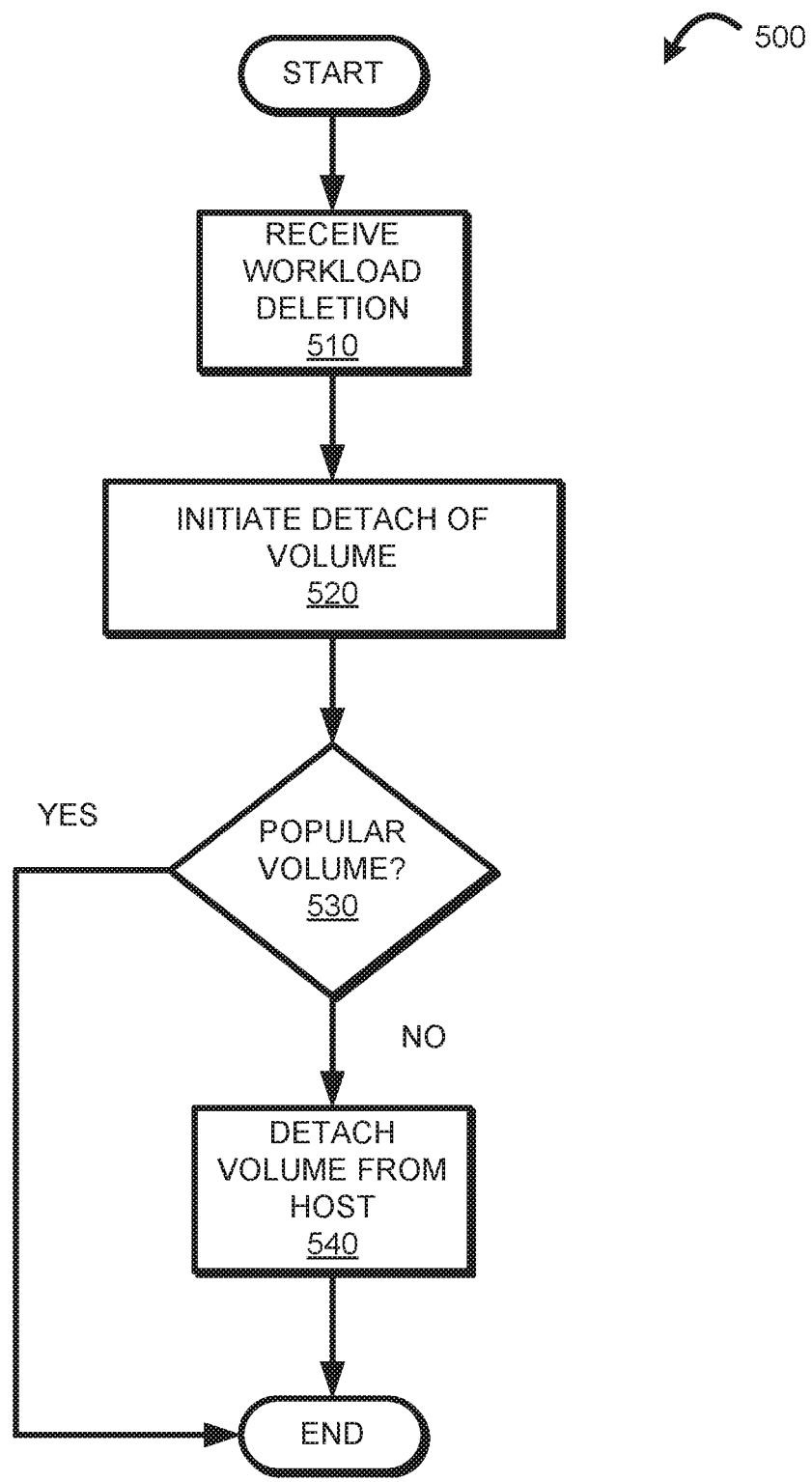
FIG. 5 is a flow diagram illustrating a process of detaching volumes from hosts, according to embodiments of the present disclosure.

FIG. 5 is a flow diagram of a process 500 for detaching volumes from a host 120, according to the present disclosure. A workload deletion request is received by the orchestrator 110 to delete a particular workload operating on some host 120. This is illustrated at step 510. A workload deletion can include deletions of applications with persistent data, applications without persistent data, batch jobs, daemons, or any process that may be operating on a host 120. The deletion request can be received by an operator who is managing the workload, an administrator of the host system 100, or the deletion request can be triggered after a predetermined time of operation.

Once the deletion request is received, the VMS 114 initiates the detachment of volumes that correspond to the workload. This is illustrated at step 520. A workload may have been utilizing several volumes which may no longer be needed by the host 120. The VDC 128 can transmit volume information of the workload back to the VMS 114 so that the volumes can be analyzed and determined whether they should be detached from the host 120. Popular volumes, as determined by process 300 in FIG. 3, can remain attached to the volume for later use. Unpopular volumes, not in use, can be detached which can conserve resources.

The VMS 114 analyzes the volume used by the deleted workload to determine whether the volume is a popular volume. This is illustrated at step 530. In some embodiments, the popular volume is determined by the process 300, where parameters are used to determine an overall rank of the volumes used in the host system 100. Also, the process 300 can be initiated upon a workload deletion to determine a rank of the volumes currently in use. If the volumes being analyzed is not considered a popular volume, the VA 126 can detach the volume from the host 120 if the volume is not in use by any other workload or application. However, if the volume is considered a popular volume, the volume is not detached from the host 120 and the process concludes.

In some embodiments, the processes of pre-attachment of volumes described herein could be implemented in a cloud computing environment, which is described below with respect to FIGS. 6, 7, and 8. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
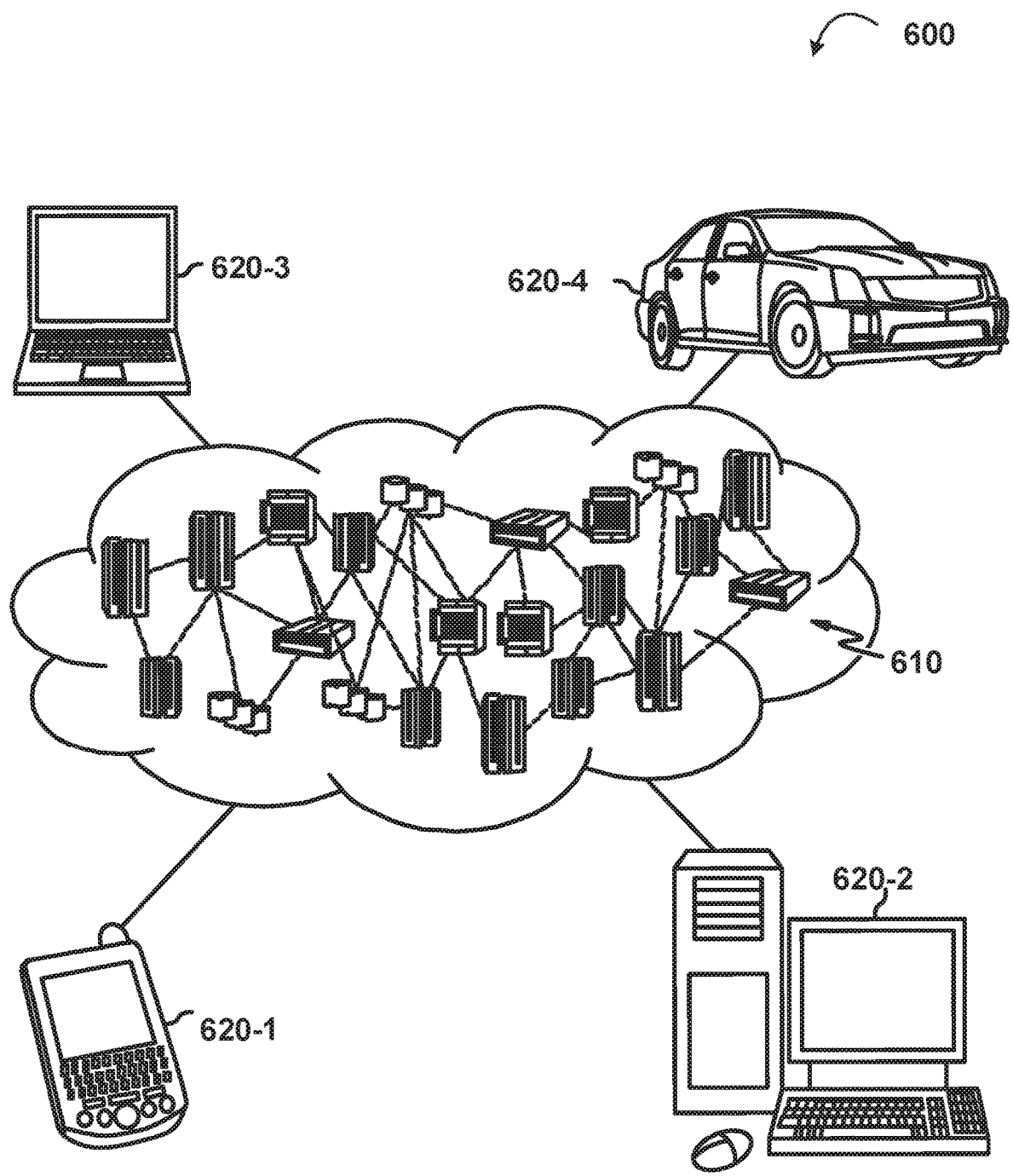
FIG. 6 is a block diagram illustrating a cloud computing environment, according to some embodiments of the present disclosure.

FIG. 6 is a block diagram illustrating a cloud computing environment 600, according to some embodiments of the present disclosure. As shown, cloud computing environment 600 includes one or more cloud computing nodes 610 with which local computing devices used by cloud consumers, such as, for example, personal digital assistant (PDA) or cellular telephone 620-1, desktop computer 620-2, laptop computer 620-3, and/or automobile computer system 620-4 may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 620-1-620-4 shown in FIG. 6 are intended to be illustrative only and that computing nodes 610 and cloud computing environment 600 can communicate with any type of computerized device over any type of network and/or network addressable connection (e.g., using a web browser).

Figure 7:
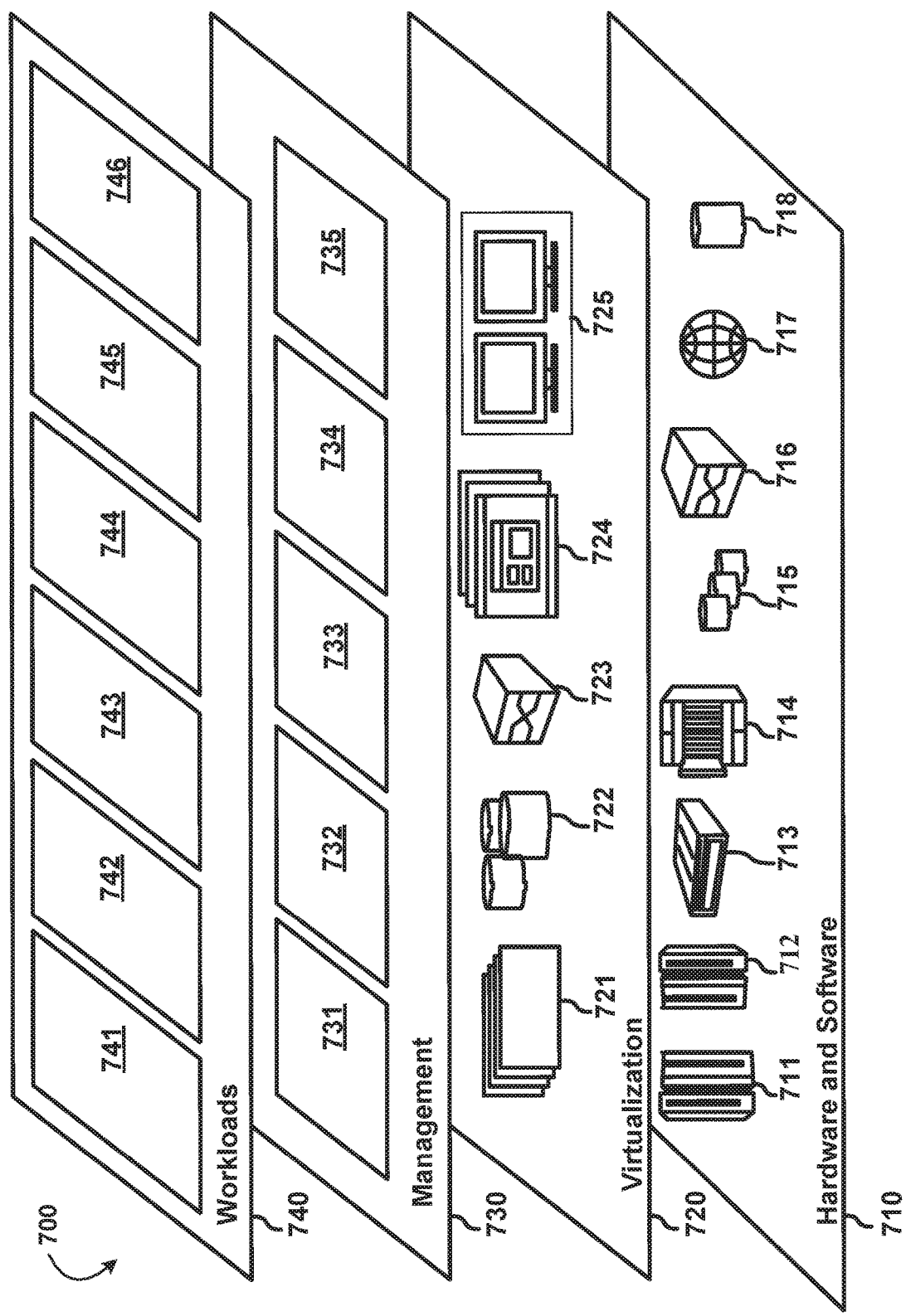
FIG. 7 is a block diagram illustrating a set of functional abstraction model layers provided by the cloud computing environment, according to some embodiments of the present disclosure.

FIG. 7 is a block diagram illustrating a set of functional abstraction model layers 700 provided by the cloud computing environment 600, according to some embodiments of the present disclosure. It should be understood in advance that the components, layers, and functions shown in FIG. 7 are intended to be illustrative only and embodiments of the invention are not limited thereto. As depicted, the following layers and corresponding functions are provided:

Hardware and software layer 710 includes hardware and software components. Examples of hardware components include: mainframes 711; RISC (Reduced Instruction Set Computer) architecture-based servers 712; servers 713; blade servers 714; storage devices 715; and networks and networking components 716. In some embodiments, software components include network application server software 717 and database software 718.

Virtualization layer 720 provides an abstraction layer from which the following examples of virtual entities may be provided: virtual servers 721; virtual storage 722; virtual networks 723, including virtual private networks; virtual applications and operating systems 724; and virtual clients 725.

In one example, management layer 730 provides the functions described below. Resource provisioning 731 provides dynamic procurement of computing resources and other resources that are utilized to perform tasks within the cloud computing environment. Metering and Pricing 732 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 733 provides access to the cloud computing environment for consumers and system administrators. Service level management 734 provides cloud computing resource allocation and management such that required service levels are met. Service Level Agreement (SLA) planning and fulfillment 735 provide pre-arrangement for, and procurement of, cloud computing resources for which a future requirement is anticipated in accordance with an SLA.

Workloads layer 740 provides examples of functionality for which the cloud computing environment can be utilized. Examples of workloads and functions that can be provided from this layer include: mapping and navigation 741; software development and lifecycle management 742; virtual classroom education delivery 743; data analytics processing 744; transaction processing 745; and determining causes of events in data sets 746.

Figure 8:
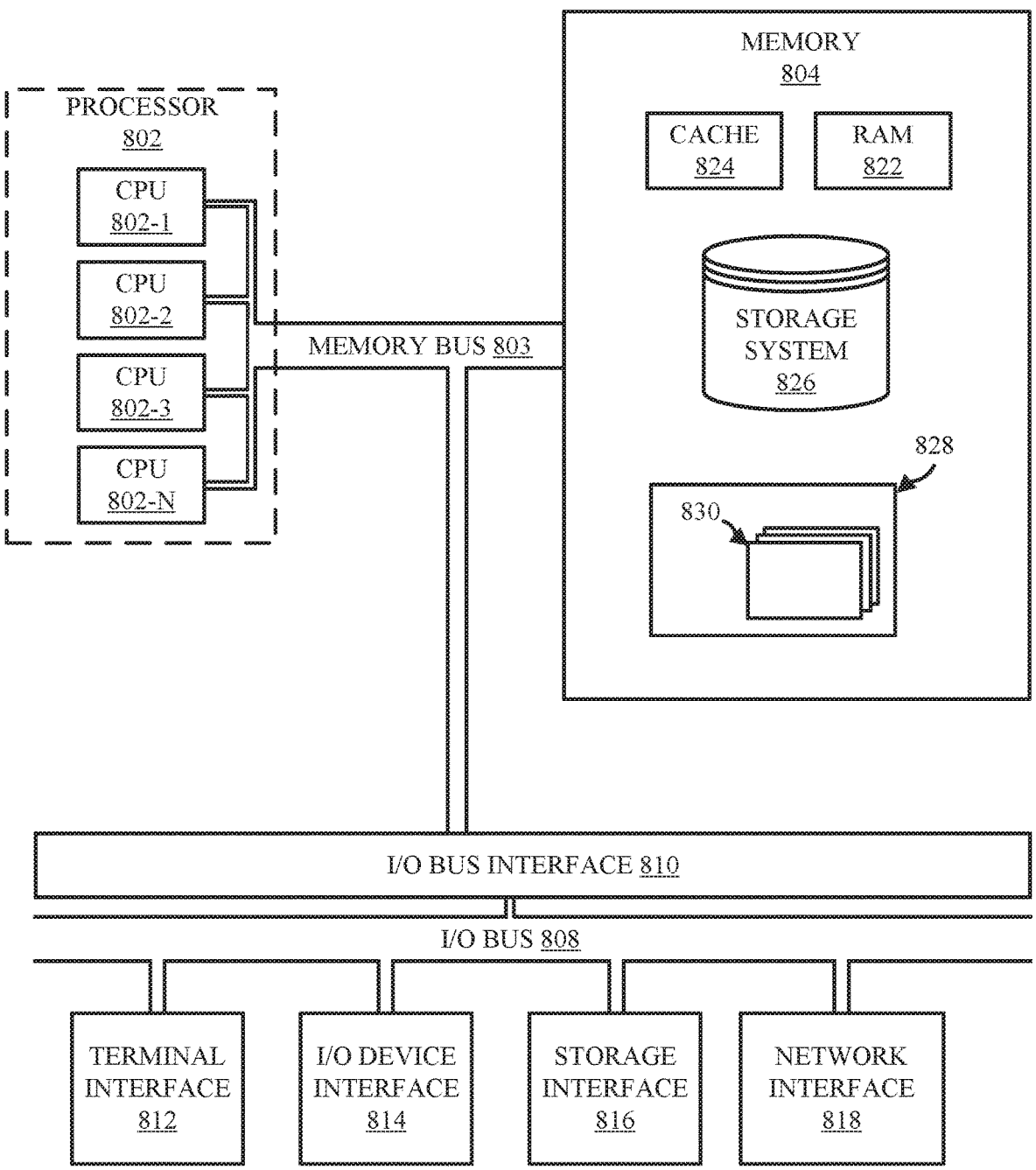
FIG. 8 is a high-level block diagram illustrating an example computer system that may be used in implementing one or more of the methods, tools, and modules, and any related functions, described herein, in accordance with embodiments of the present disclosure.

Referring now to FIG. 8, shown is a high-level block diagram of an example computer system 801 (e.g., devices 105, server 135, device 205, retention enhancement system 201) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 801 may comprise one or more CPUs 802, a memory subsystem 804, a terminal interface 812, a storage interface 816, an I/O (Input/Output) device interface 814, and a network interface 818, all of which may be communicatively coupled, directly or indirectly, for inter-component communication via a memory bus 803, an I/O bus 808, and an I/O bus interface unit 810.

The computer system 801 may contain one or more general-purpose programmable central processing units (CPUs) 802-1, 802-2, 802-3, and 802-4, herein generically referred to as the CPU 802. In some embodiments, the computer system 801 may contain multiple processors typical of a relatively large system; however, in other embodiments the computer system 801 may alternatively be a single CPU system. Each CPU 802 may execute instructions stored in the memory subsystem 804 and may include one or more levels of on-board cache.

System memory 804 may include computer system readable media in the form of volatile memory, such as random-access memory (RAM) 822 or cache memory 824. Computer system 801 may further include other removable/non-removable, volatile/non-volatile computer system storage media. By way of example only, storage system 826 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 804 can include flash memory, e.g., a flash memory stick drive or a flash drive. Memory devices can be connected to memory bus 803 by one or more data media interfaces. The memory 804 may include at least one program product having a set (e.g., at least one) of program modules that are configured to carry out the functions of various embodiments.

One or more programs/utilities 828, each having at least one set of program modules 830 may be stored in memory 804. The programs/utilities 828 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 828 and/or program modules 830 generally perform the functions or methodologies of various embodiments.

In some embodiments, the program modules 830 of the computer system 801 may include a retention enhancement module. The retention enhancement module can be configured to obtain user data for a user currently reading electronic text on a device, analyze the user data to determine whether a retention action should be issued, and execute a retention action in response to a determination that the retention action should be issued.

Although the memory bus 803 is shown in FIG. 8 as a single bus structure providing a direct communication path among the CPUs 802, the memory subsystem 804, and the I/O bus interface 810, the memory bus 803 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 810 and the I/O bus 808 are shown as single respective units, the computer system 801 may, in some embodiments, contain multiple I/O bus interface units 810, multiple I/O buses 808, or both. Further, while multiple I/O interface units are shown, which separate the I/O bus 808 from various communications paths running to the various I/O devices, in other embodiments some or all of the I/O devices may be connected directly to one or more system I/O buses.

In some embodiments, the computer system 801 may be a multi-user mainframe computer system, a single-user system, or a server computer or similar device that has little or no direct user interface but receives requests from other computer systems (clients). Further, in some embodiments, the computer system 801 may be implemented as a desktop computer, portable computer, laptop or notebook computer, tablet computer, pocket computer, telephone, smart phone, network switches or routers, or any other appropriate type of electronic device.

It is noted that FIG. 8 is intended to depict the representative major components of an exemplary computer system 801. In some embodiments, however, individual components may have greater or lesser complexity than as represented in FIG. 8, components other than or in addition to those shown in FIG. 8 may be present, and the number, type, and configuration of such components may vary.

The present disclosure may be a system, a method, and/or a computer program product. The computer program product may include a computer readable storage medium (or media) having computer readable program instructions thereon for causing a processor to carry out aspects of the present disclosure.

The computer readable storage medium is a tangible device that can retain and store instructions for use by an instruction execution device. Examples of computer readable storage media can include an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a component, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the present disclosure.

What is claimed is:

1. A system, comprising:
   a processor;
   a memory to store instructions, which when executed from the memory, cause the processor to perform operations on the system,
   analyzing a plurality of hosts on a network to determine various attributes of the hosts;
   identifying a least populated host based on analyzing the plurality of hosts, wherein the least populated host is identified based on the attributes of the hosts;
   selecting at least one popular volume on the network based on the analyzation of the hosts, wherein the popular volume is identified as a volume type most frequently used by the hosts on the network;
   attaching the popular volume to the least populated host;
   triggering an initiation event, wherein the initiation event prompts a determination of least popular volumes on the least populated host;
   determining at least one unpopular volume on the least populated host based on a volume popularity list;
   determining whether the unpopular volume is a same type as the popular volume; and
   upon determining that the unpopular volume is not the same type as the popular volume, detaching the unpopular volume.

2. The system of claim 1, wherein the least populated host is based on a fewest number of containers deployed on at least one of the hosts on the network.

3. The system of claim 1, wherein identifying at least one populated host on a network, comprises:
   detecting a number of containers deployed on the hosts;
   determining a CPU usage for the hosts, wherein the CPU usage is a percentage of processing power used by the hosts;
   determining a memory usage for the hosts, wherein the memory usage is a percentage of total memory used by the hosts; and
   selecting a least populated host based on the number of containers deployed, the CPU usage, and the memory usage of the hosts.

4. The system of claim 1, wherein identifying at least one popular volume comprises:
   determining a plurality of volumes used on the network;
   ranking the volumes to develop a rank based on parameters of the volumes;
   determining a rank threshold based on the rank of the volumes to determine which volumes to attach to the least populated host; and
   identifying at least one popular volume that is ranked greater than the rank threshold.

5. The system of claim 4, wherein a rank threshold is a summation of the ranks for the volumes divided by a total number of volumes on the network.

6. The system of claim 4, wherein the parameters include a container usage amount, in which volume container usage amount indicates a number of containers utilizing each of the volumes.

7. A computer program product for deploying pre-attached hosts, the computer program product comprising a computer readable storage medium having program instructions embodied therewith, the program instructions executable by a processor to cause the processor to:
   receive a workload, the workload includes a workload volume list of at least one volume type to be used by the workload;
   determine a plurality of available hosts;
   determine a plurality of available pre-attached hosts, the pre-attached hosts include a plurality of volumes attached to the pre-attached hosts used on a network;
   rank the volumes to develop a rank based on parameters of the volumes;
   determine a rank threshold based on the rank of the volumes to determine which of the volumes to attach to the least populated host, wherein the rank threshold is a summation of the ranks for the volumes divided by a total number of volumes on the network;
   identify at least one popular volume that is ranked greater than the rank threshold;
   compare the available hosts to the pre-attached hosts attached with the at least one popular volume;
   selecting a selected host based upon the comparison of the available hosts to the pre-attached hosts; and
   deploy the workload on the selected host.

* * * * *